Aug. 20, 1940.   J. J. O'CONNOR   2,211,908
MANUFACTURE OF CAUSTIC SODA AND CALCIUM CARBONATE
Original Filed Oct. 17, 1932
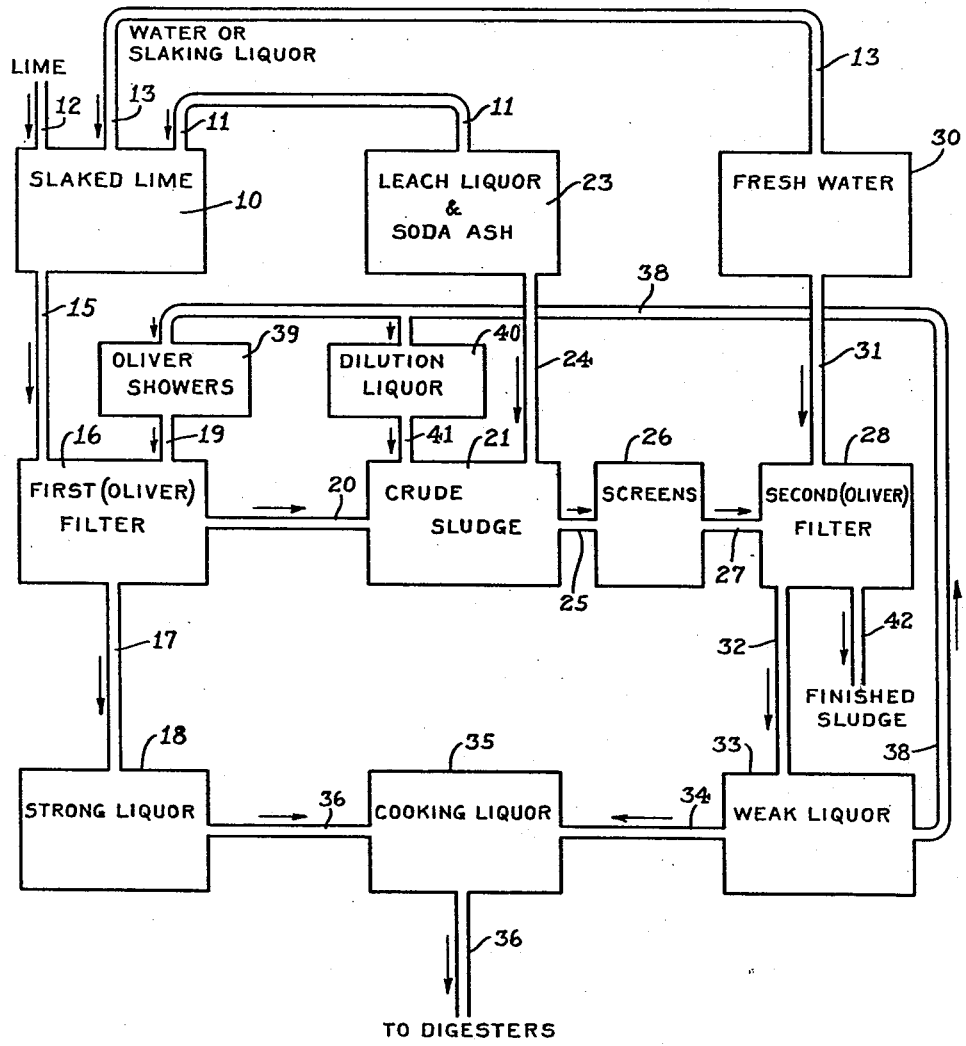
INVENTOR
James J. O'Connor
BY
Maréchal & Noe
ATTORNEYS Patented Aug. 20, 1940

2,211,908

UNITED STATES PATENT OFFICE 2,211,908

MANUFACTURE OF CAUSTIC SODA AND CALCIUM CARBONATE

James J. O'Connor, Chillicothe, Ohio, assignor to The Mead Corporation, Chillicothe, Ohio, a corporation of Ohio Continuation of application Serial No. 638,135, October 17, 1932. This application November 18, 1937, Serial No. 175,317

7 Claims. (Cl. 23—66)

This invention relates to the field of paper manufacture, and more particularly to the treatment of waste digestion liquor in the chemical production of pulp to effect recovery of the digestion chemicals and by-product recovery of a mineral or pigment suitable for use as a high quality mineral filler in the manufacture of mineral filled book paper or better grades of filled and coated printing papers.

In the manufacture of paper and pulp, employing caustic containing cooking liquor, such as in the soda cooking process, it has long been the practice to recover this cooking liquor for use in the cooking of fresh fibrous material. This is generally accomplished by evaporating the spent cooking liquor to dryness, incinerating the dried material in a furnace, and then lixiviating the incinerated ash in water or suitable liquor to dissolve out the soluble compounds, mainly sodium carbonate, from the carbon residue and other impurities. The resultant soda ash solution is then causticized by treatment with lime with the production of caustic soda liquor and the formation of a precipitate consisting mainly of calcium carbonate and known in the industry as "lime sludge" or "lime mud."

In the manufacture of so called book paper, such as is used for the printing of better grade magazines—like Time, Life, Saturday Evening Post—it has long been the universal practice to utilize a good grade of pulp stock and to add to such stock a large amount of finely divided mineral, so that the finished sheet will have retained and incorporated therein as much as upwards of 25% of mineral known as "filler." This mineral has always been carefully selected as to color, size range and character so as to enhance the appearance and printing characteristics of the sheet. The filler formerly used was secured from the processing of certain deposits of clay occurring naturally in this country and in England. Such clays, at least in many instances, have not proper natural characteristics and were subjected to bleaching, etc., to make them suitable for meeting the exacting requirements of the paper making and printing industries.

While lime sludge had been produced in large quantity in the paper industry for many years as a burdensome waste product resulting from the universally practised method of recovery of sodium hydroxide (described briefly above) no one had found any suitable method for treating such waste product, or of modifying the recovery process, to produce a material practicable as a mineral for commercial filler use until one Harold R. Rafsky discovered that by the use of certain high magnesium content limes, known in the industry as "dolomitic lime," for the causticizing operation in such recovery process he could secure a mixture of calcium carbonate and magnesium hydroxide having qualities far different from the large particle size, ordinary lime sludge as universally produced in said recovery process in pulp mills. This is treated of at length in the patent of Harold R. Rafsky No. 1,598,104, issued August 31, 1926, in which he describes his process of recovery for producing this material, known as "Raffold," as producing a material quite distinct from such former carbonate recovery material in the paper industry and which is of such color, particle size, and characteristics attributable to the admixture of calcium carbonate and large percentage of magnesium hydroxide, that it could be used as a filler material. Applicant's assignee was the first substantial user of that Raffold material as a filler, which has found limited but satisfactory use in the paper industry as a substitute for the clay filler material formerly, and since, generally used.

It was not until the development set out in the patent to James J. O'Connor and Donald F. Morris, No. 1,935,482, that any successful method was developed for processing the lime sludge made from the more usual, or so called "high calcium" lime, as opposed to dolomitic or "high magnesium" lime, to make a satisfactory mineral suitable and usable as a filler for paper. In that patent to O'Connor and Morris (which was copending with the original application of which the present application is a continuation) there is described a method of processing this ordinary, or high calcium, lime sludge by grinding, as in the presence of a suspension improving material, and other treatment, so as to make it available as a satisfactory body filler for printing paper. The paper produced from such processed lime sludge in accordance with the teachings in the mentioned patent has certain qualities superior to paper as theretofore made and filled with the usual high grade clay filler. Also it is comparable in characteristics to a paper filled with the specially prepared precipitate of finely divided calcium carbonate and magnesium hydroxide, the Raffold heretofore referred to. The desirability of a method of recovering and processing in the paper pulp industry using such much more widely available and used high magnesium lime was well recognized.

The natural occurrence and mining of dolomitic limestones are in scattered localities. This had limited the use of Raffold, as these processes are most efficiently and cheaply carried on as part of the necessary soda recovery of the pulp mill of a paper manufacturing plant where the recovered carbonate material may be used. And prior to the present invention there had been no process of recovery using ordinary high calcium lime to produce a fine grain, slow settling precipitate suitable for use as a filler for printing paper. It has been the prior belief and experience that only coarse grained rapid settling precipitates of calcium carbonate could be obtained by a slaking and causticizing operation employing the usual high calcium limes, the resulting calcium carbonate precipitate being unsuited without special processing or treatment such as disclosed in the mentioned O'Connor and Morris application for the production of a pigment for filler for paper of this character.

I have now discovered that a very satisfactory pigment or filler for printing paper can be produced in the regular slaking and causticizing operations employed in the recovery of spent caustic or soda containing cooking liquor by utilizing a high calcium lime, and without subsequent processing of the lime sludge precipitate so produced. I have further provided a cyclic and self-contained process for the manufacture of printing paper of this character, in which the caustic or soda containing cooking liquor used in the making of the pulp for the paper is regenerated and recovered by such a treatment as to produce directly a finely divided, uniformly slow settling high calcium lime precipitate of good high color which is utilized as a pigment or filler in the paper manufactured from the pulp so produced. This invention affords unusual economies in manufacture, inasmuch as the pigment or filler for the paper is produced as a by-product of a necessary operation in the recovery of the spent cooking liquor, thereby eliminating the necessity for the employment of more expensive fillers which must be purchased on the market, eliminating the utilization of dolomitic limes which are more expensive particularly at certain mills and which produce a different product, and eliminating the necessity for special after-treatments such as grinding of the ordinary lime sludges heretofore produced with high calcium lime. At the same time a paper of superior printing quality is produced.

One of the principal objects of this invention is to provide such a cyclic and self-contained process for the manufacture of paper of this character with regeneration of spent cooking liquor used in the pulping of the fibrous material and the concomitant production of a superior and economical pigment or filler for paper of this character.

Another object of the invention is to provide a method of producing such a pigment or filler for paper of this character directly in the regeneration of spent cooking liquor and without special processing thereof.

Other objects and advantages of the invention will be apparent from the following description, the appended claims and the accompanying drawing.

In the drawing, the single figure is a diagrammatic view or flow sheet of mechanism adapted for carrying out the method of this invention, but inasmuch as conventional forms of apparatus are used illustration of the construction thereof is not necessary.

This application is a continuation of my earlier filed application Serial No. 638,135, filed October 17, 1932.

Referring to the drawing, in which is shown a flow sheet of a preferred embodiment of apparatus for practicing the method of this invention, there is illustrated at 10 a tank for the slaking of the high calcium lime. This tank may be of conventional construction, being equipped with suitable agitators, and preferably high speed agitators. In accordance with the present invention, the high calcium lime is first slaked with water or a liquor which is substantially free from soda ash, before causticization with soda ash solution is allowed to take place. It has been discovered that where the slaking is carried out in the presence of water containing substantial amounts of soda ash, a coarse grained rapid settling calcium carbonate precipitate is produced. On the other hand, where a high calcium lime of predetermined characteristics is first slaked in a controlled manner with water prior to causticization, it is found that a finely divided slow settling calcium carbonate precipitate can be produced in regular commercial operations in accordance with this invention.

In slaking the lime, it is preferable to use a small quantity of water such as will thoroughly slake the lime to calcium hydrate, and produce a relatively thick pasty mass approaching the consistency of whipped cream. The use of only a small quantity of slaking water is desirable not only because it allows the subsequent use of leach liquor or soda ash solution of greater dilution in the succeeding causticizing step, but also because it results in the more uniform production of a calcium carbonate or lime sludge precipitate of a slower settling rate and finer particle size. A thorough or high speed agitation providing uniform slaking is also found desirable, and prevents caking or lumping of the slaked lime. Preferably the slaking tank is cooled, as by a water jacket, so that the mixture being slaked can be kept below boiling. In general, it may be stated that the cooler the slaking reaction, the slower settling will be the ultimate carbonate product. Further, it can be stated that in general, as high an agitating speed as practical is desirable in the slaking operation, for the higher the speed used within practical limits, the slower the settling rate of the resultant carbonate product. As stated above, water is the preferred slaking medium, although dilute caustic liquor such as may be discharged from the washers in certain of the causticizing processes, may be used provided the carbonate content of the liquor is very low or practically negligible.

In practice, a calculated amount of water or suitable slaking liquor, determined on the amount of high calcium lime to be slaked, is added to tank 10 by line 11. The agitator or high speed mixer is then started and a controlled stream of high calcium lime is added as indicated at 12. The gradual addition of the lime to the water is found effective in rapidly slaking the individual lime particles with water and preventing caking or lumping of the slaked lime. The addition of lime is continued until all of the predetermined or calculated amount has been introduced, at which time a mass of thick creamy consistency is produced. The agitation is continued to insure completion of the slaking reaction with the limited amount of water used, generally from fifteen minutes to two hours being sufficient.

In the apparatus of the drawing the causticization is then carried out in two stages; in the first stage an excess of slaked lime is present, and in the second stage an excess of soda ash solution or leach liquor is present. As shown, leach liquor which may be produced by lixiviating the incinerated ash in the recovery operation of spent soda cooking liquor, and fortified if desired with the quantity of fresh soda ash needed to compensate for losses in the recovery operation, is added to the slaked lime in tank 10 by the pipe line 11 from a suitable source of supply such as the leach liquor storage tank 23. The leach liquor is preferably added hot, being preheated by a steam jacket if a supply of hot leach liquor is not available; and the tank 10 is heated as by the introduction of live steam to bring the mixture to a boil. The agitator is kept running during the addition of the leach liquor, which is preferably added slowly for best results as to quality of the resulting carbonate product; and then the contents are boiled as necessary to carry this first stage causticizing to completion, for example about ten minutes.

The proportion of ingredients added is such that a substantial excess of slaked lime or calcium hydrate is present in the mix, and neutralizes a definite controlled percentage of the soda ash or sodium carbonate introduced with the leach liquor. As a convenient means for determining the amount of leach liquor to be added, the percentage relationship between the sodium content present as hydroxide (resulting from the reaction of the calcium hydrate with sodium carbonate), and the total sodium compounds present (including the regenerated sodium hydroxide and any unreacted sodium carbonate), is determined and called "percentage causticity." This percentage relationship is governed by the proportion of calcium hydrate and sodium carbonate used in the batch, the dilution of the mix, the temperature of the reaction, and the composition of the materials involved. Very satisfactory results are secured in regular commercial operations by the addition of ingredients in such proportion as to produce a percentage causticity in excess of 85% and preferably of approximately 90% to 93% in this first stage of the causticizing operation. The chemical reaction between lime hydrate and soda ash is reversible, which accounts for the incomplete conversion of soda ash to sodium hydroxide, even though a substantial excess of lime hydrate over the calculated amount needed for conversion of the added soda ash is present. The percentage causticity may be conveniently determined by titrating a sample of the filtered liquor with a standard hydrochloric acid solution. The liquor is first titrated to an end point with phenolphthalein indicator, then methyl orange indicator is added and the titration continued until the solution is acid to the latter indicator. If A cubic centimeters of acid are used to obtain the phenolphthalein end point, and B cubic centimeters (total including A) used to obtain the methyl orange end point, the following formula gives the percentage causticity:

$$\frac{B-2(B-A)}{B} \times 100 = \text{percent causticity}$$

When tests indicate that the desired percentage causticity has been reached, the contents of the tank 10, comprising at this stage liquor containing sodium hydroxide and a small amount of sodium carbonate together with suspended lime hydrate and calcium carbonate precipitate or lime sludge, are passed by line 15 to a suitable filter, such as an Oliver filter 16, to separate the solids from the liquor. As the lime sludge precipitate is extremely fine, it is desirable to cover the straining surface of the Oliver filter with a cloth in addition to the usual wire screen. Vacuum being applied to the interior of the drum filter in the usual manner, the strong caustic liquor is drawn through the filter and is passed by line 17 to the strong liquor storage tank 18, while the suspended solids are caught on the cloth of the filter to form a cake or mat thereon. The filter cake on the Oliver is washed with fine water jets supplied by line 19 to remove most of the retained liquor containing dissolved alkali, and then the cake is doctored off of the filter surface in the usual manner and passed as indicated at 20 to a second tank 21 where the second stage of the causticization takes place.

In this second stage, in the arrangement of apparatus as shown, an excess of sodium carbonate in the form of leach liquor with make-up soda ash is added from the leach liquor storage tank 23 by line 24, to completely convert the remaining lime hydrate, which was present in excess in the first causticizing stage, to calcium carbonate. This is accomplished by the addition of a calculated excess of sodium carbonate solution, which is determined by the percentage causticity of the resulting mix in tank 21 in the manner previously described. Very satisfactory results are secured in this second stage by utilization of a percentage causticity which is somewhat lower than in the previous stage, for example below 85% and preferably about 80%. As in the previous causticizing stage, the leach liquor is preferably added hot, and the contents of tank 21 are agitated and brought to a boil, as by live steam, and maintained at approximately boiling temperature until the reaction is complete, as determined by the percentage causticity measured from time to time. Generally about half an hour to an hour is sufficient for this second stage.

Since nearly all lime contains some silica and other impurities in the form of sand or other large or heavy particles, it is desirable to thoroughly screen or classify the product to effect their removal. Accordingly, the slurry or mix from tank 21 is pumped by line 25 to a suitable screen or classifier 26. Very satisfactory results are obtained by the use of a vibratory screen having a fine mesh, for example, about 150 to 250 mesh. The solution and the finely divided calcium carbonate pass through the screen filtering out the sand and suspended impurities and also any lumps, which are retained on the screen and subsequently discharged to waste.

The slurry passing through screen 26 is then supplied by line 27 to a second filter 28, which is preferably of the rotary or Oliver type and substantially identical with the first filter 16. The filter cake caught on the straining surface of the drum at filter 28 is thoroughly washed by fresh water sprays supplied from the fresh water tank 30 by line 31. Tank 30 may also be utilized as the source of supply of slaking water to line 13 supplying tank 10. The liquor passing through the filter 28, together with the effluent from the washing sprays is supplied by line 32 to a weak liquor storage tank 33.

A suitable proportion of this weak liquor may be supplied by line 34 to a cooking liquor storage tank 35 which is also supplied by line 36 with strong liquor from tank 18. In this manner, cooking liquor of the desired strength for utilization in the subsequent cooking operations of fresh fibrous material is produced without requiring additional dilution with fresh water, thereby making use of excess weak liquor and maintaining a balance between the strong and weak liquors so that the combination of the two will be suitable for cooking purposes. This cooking liquor is passed from tank 35 by line 36 to the battery of digesters (not shown), where the cooking operation is carried out. After the cooking operation in each digester, it is blown or dumped in the customary manner, the liquor allowed to drain from the cooked and pulped fibrous material which may be washed with additional water sprays, and the mixed spent cooking liquor plus the removed washing liquor is then evaporated, incinerated and lixiviated in the customary manner as long practiced in the recovery of caustic containing cooking liquor. The lixiviated solution of soda ash thus produced is supplied to the leach liquor tank 23, together with the required amount of make-up soda ash needed to compensate for losses of soda in the recovery process. Generally, a recovery of about 85% of soda is customary, and 15% of fresh soda ash is then added. In order to obtain a lime carbonate precipitate of good color free from dark specks, the leach liquor employed should be as nearly colorless as possible and should be free from suspended carbon particles. To obtain such a liquor, it is desirable to burn the ash in the incinerating operation as completely as possible within practical operating limits, and then to eliminate the carbon particles in the lixiviated soda ash solution by passing the solution through a suitable filter, for example, through a Sweetland wire cloth filter using a soda pulp mat on the cloth of the filter to catch and remove very finely divided suspended particles.

To secure further economy, the excess of weak liquor accumulated in tank 33 over that required for use in the production of the cooking liquor in tank 35, may be supplied by line 38 to a wash liquor storage tank 39 which is used to supply pipe 19 for the spray showers on the first Oliver filter 16. Another portion may be supplied to a dilution tank 40 from which it is fed by line 41 to the second causticizing tank 21 to be used as dilution liquor in this second causticizing operation.

The filter cake on the second Oliver filter is washed thoroughly to free it as far as practical from dissolved and retained alkali. The cake is then doctored off of the second filter and passed as indicated at 42 to a make-down tank (not shown) where it is diluted with water and other usually used constituents to the desired consistency for addition to the paper. Any free alkali and unconverted calcium hydrate which still may be present in the filler material is preferably neutralized by the addition of a calculated amount of acid or acid-reacting material, such as sulfuric acid, before addition of the filler to the paper material. Where the operations described herein are carried on in connection with a paper mill manufacturing filled paper, the filler material as formed in the described causticizing operations can be directly supplied to the paper forming stock produced in the cooking operations. For example, the filler diluted to desired consistency to form a slurry can be added at the beaters together with the pulp and other ingredients of the furnish, or it can be added to the furnish later as at the paper machine riffles, or just prior to the passage of the paper forming stock onto the forming machine. If the paper mill is at some distance from the pulp mill, the filler material as it is doctored off of the second Oliver 28, may be further dried, partially or entirely, and shipped to the point of use, there to be made down, neutralized, and added to the paper furnish in the manner described above. This, of course, involves added cost of drying, handling, etc.

The finished filler is a product of superior whiteness, and is of very fine particle size as indicated by screen tests and settling rates. Very satisfactory results are secured with a filler material of such fine particle size that it will pass a 325 mesh screen with only about 1% thereof retained on the screen. Usually, the carbonate when produced as described above is of such character that less than 0.5% is retained on a 325 mesh screen. The settling rate of the carbonate filler in suspension in water is also employed to determine the character of the product. In order to standardize the settling tests, the following procedure can be employed with good results. A suspension of the filler in water containing 5% total solids is prepared and then poured into a 1 liter graduate to fill the graduate to the 1000 cc. graduation. The graduate and contents are then allowed to stand for five minutes time, when the line of demarkation between the milky suspension of solids below and the comparatively clear water above is noted. Generally, the filler material produced by this invention shows a settling rate of about 125 to 175 cc. or less, employing the above test. This means that the solids have settled in the graduate so that the lower portion they occupy is clearly demarked from the upper portion, there being only about 125 to 175 cc. of water above the clear line of demarkation for the upper limit of the suspended solids. It is to be understood that this figure is only given by way of example, and that for some purposes either a slower or more rapidly settling product may be desirable. In general, however, it may be stated that a settling rate of less than 350 cc. in five minutes is preferable in accordance with this invention. The free alkali in the filler material should preferably test less than .05% expressed as $Na_2CO_3$.

It is found that the character of the high calcium lime used also has an important bearing on the characteristics of the carbonate precipitate obtained. Where a high calcium lime of proper characteristics is utilized in accordance with this invention as described above, a finely divided slow settling precipitate of proper characteristics for utilization as a pigment or filler for paper is obtained in regular commercial operations. However, not all high calcium limes available on the market appear suited for this purpose. The lime should have a good color, that is, a high white color, and not be contaminated by the presence of substantial amounts of iron or other coloring agents. Suitability of high calcium limes of good color for purposes of this invention are determined by running tests on the available CaO content or "available lime," which means the proportion of lime which is in such chemical or uncombined state that it is readily reactive according to the method employed and is readily slaked. Generally a high calcium lime having available CaO content in excess of 80% and preferably about 85% or over, is found to give good results.

A more important test, however, in the selection of high calcium limes for purposes of this invention is the settling test. This is carried out by slaking a small portion of the lime, causticizing the slaked portion with soda ash solution under conditions similar to those used in the commercial process as described above, and then testing the settling rate of the resulting precipitate by preparing a 5% suspension and allowing the suspension to settle for five minutes in a 1000 cc. graduated cylinder. A suitable lime generally shows a settling rate less than about 350 cc., preferably about 125 to 175 cc., or less, in five minutes time. A mill trial of the lime is ordinarily run to check the results obtained on the small scale.

Where the expression "high calcium lime" is used throughout the description and claims, it is to be understood that this has the customary meaning in the art as referring to a lime having a CaO content generally in excess of 90%, and having only a small quantity of MgO which is generally less than 5% but may in some instances exceed 5% but is less than 10%; as distinguished from the recognized and customary meaning of a "dolomitic lime" which has an MgO content in excess of 10% and generally around 40% to 50%.

In actual commercial practice, a high calcium lime usually has a very small percentage of MgO. As an example of a high calcium lime which has been found very suitable for purposes of this invention, there is mentioned a lime having an available CaO content of approximately 85%, a settling rate when slaked and causticized in the manner described above of about 150 cc. in five minutes, and the following chemical analysis on an air dry basis:

|  | Per cent |
|---|---|
| Silica | .07 |
| Iron oxide and alumina | .57 |
| CaO | 98.86 |
| MgO | .50 |

However, high calcium limes of widely varying composition within the limits specified above have been found suitable for purposes of this invention when slaked and causticized in accordance with the process described herein.

As a typical example for the satisfactory carrying out of this invention in commercial operation, the following is mentioned:

Thirty-eight hundred pounds of lime are slaked in a tank with about 1600 gallons of cold water and the mixture agitated thoroughly for about fifteen minutes. These proportions are such that the amount of water relative to the amount of lime to be slaked therein is in approximately the ratio of three and one-half parts of water to one of lime, and will produce the relatively thick pasty mass of slaked lime of the creamy consistency, or consistency of whipped cream, above referred to. At the end of the slaking period 6500 pounds of soda ash in the form of a solution of about 15 pounds per cubic foot are added slowly through a pipe line into the slaking or reaction tank. With these proportions the amount of water relative to the soda ash dissolved therein is in approximately the ratio of three and one-half parts of water to one of sodium carbonate. The soda ash solution is added hot, say at about 180 degrees Fahrenheit, and as it is being added steam is led into the tank and the mixture agitated. By the use of the desired proportions, such as described, the controlled dilution of the mix is secured, with the amount of water relative to said reacting constituents, when introduced into the reaction tank, in approximately the ratio of three and one-half to one. After the ingredients are all in, the boiling is continued for about 15 minutes then the liquor tested. The liquor generally tests 110 to 120 grams per liter of sodium hydroxide with about 90 to 93 per cent causticity.

The mixture is then filtered on an Oliver filter with the carbonate precipitate at about 50% solids dropping into another reaction tank. To start this reaction leach liquor containing about 900 pounds of soda ash is added. The concentration of the soda in the leach liquor is about 12 pounds per cubic foot. Steam is then turned on and the mixture brought to a boil. The liquor is then tested and adjusted by adding dry soda ash to give a causticity of around 80%. Generally 100 to 300 pounds of soda ash are added at this point. The liquor after adjusting usually tests between 36 to 48 grams per liter of sodium hydroxide, at 80% causticity.

The carbonate precipitate is screened through a 200 mesh screen, and then filtered, washed, and thickened on an Oliver filter to about 50% solids. The filtered material is dropped to a storage tank and diluted with water to give a slurry of the proper consistency for pumping. About 7 to 10 gallons concentrated sulfuric acid may be added at this point to remove excess alkali.

As an example of a suitable furnish prepared in accordance with this invention and adapted particularly for the manufacture of magazine grades of printing paper, the following is mentioned:

|  | Per cent |
|---|---|
| Sulfite pulp | 20 to 25 |
| Old paper stock and broke | 20 |
| Soda pulp | 55 to 60 |

To about 2200 lbs. (air dry basis) of this pulp is added about 300 to 600 lbs. of this finely divided carbonate precipitate or filler. In general about 15% to 30% by weight of such filler on the dry weight of the pulp is satisfactory for this grade of paper. A small amount of a coloring material, such as ultra marine or color lakes, is preferably added to the furnish to improve the color of the paper. In this case, a small quantity of mordant, such as alum, is also added, which is found to effect improved retention of the coloring material in the stock to give a better color to the final product.

While the method herein described constitutes a preferred embodiment of the invention, it is to be understood that the invention is not limited to this precise method, and that changes may be made therein without departing from the scope of the invention which is defined in the appended claims.

What is claimed is:

1. In the recovery of soda from spent digestion liquor of the paper pulp industry, the method of securing recovery of the soda as sodium hydroxide and of producing a fine grained calcium carbonate usable as a filler material for paper which comprises reducing the spent digestion liquor by incineration to sodium carbonate, lixiviating to provide a solution of such sodium carbonate free from objectionable carbon and the like impurities, slacking a high calcium line in the presence of predetermined limited quantity of water substantially free from sodium carbonate while maintaining the slaking temperature substantially below boiling and effecting thorough agitation whereby to secure quick and substantially complete slaking of the high calcium lime and to produce a suspension of fine particle size calcium hydroxide controlled as to dilution to substantially approximate a creamy consistency, admixing said sodium carbonate solution with said lime suspension in controlled relative proportions with the calcium hydroxide suspension in an amount less than the equivalent chemical quantity of lime and insufficient to convert all the slaked lime to carbonate and in the presence of water in the proportion of the order of three and one-half parts thereof to one part of reacting constituents to provide a sodium hydroxide having a percentage causticity of above 85%, bringing the admixture to a boil with the formation of a calcium carbonate precipitate, separating the precipitate from the liquor, then adding a controlled excess of soda ash solution to the separated precipitate to effect substantially complete conversion of the lime to carbonate and to provide a sodium hydroxide solution having a percentage causticity below 85% and to produce a finely divided slow settling calcium carbonate suitable in its state of precipitated division of passing through a 150 mesh screen and substantially all of which will pass through a 325 mesh screen and whereby it will act as a superior filler material for paper, and finally separating the resultant precipitated filler material from such liquor and washing such separated material to produce a filler material suitable for use as a filler for book paper and the like.

2. In the recovery of soda from spent digestion liquor of the paper pulp industry, the method of securing recovery of the soda as sodium hydroxide and of producing a fine grained calcium carbonate usable as a filler material for paper which comprises reducing the spent digestion liquor by incineration to sodium carbonate, lixiviating to provide a solution of such sodium carbonate free from objectionable carbon and the like impurities, slaking a high calcium lime in the presence of predetermined limited quantity of water substantially free from sodium carbonate with the amount of slaking water in the proportion of the order of three and one-half parts of water to one of lime while maintaining the slaking temperature substantially below boiling and effecting thorough agitation whereby to secure quick and substantially complete slaking of the high calcium lime and to produce a suspension of fine particle size calcium hydroxide controlled as to dilution to substantially approximate a creamy consistency, admixing said sodium carbonate solution in a hot condition at a temperature of the order of 180° F. with said lime suspension in controlled relative proportions with the sodium carbonate in an amount less than the equivalent chemical quantity of lime and insufficient to convert all the slaked lime to carbonate to provide a sodium hydroxide having a percentage causticity of above 85%, and of the order 90-93%, bringing the admixture to a boil with the formation of a calcium carbonate precipitate, separating the precipitate from the liquor, then adding a controlled excess of soda ash solution to the separated precipitate to effect substantially complete conversion of the lime to carbonate and to provide a sodium hydroxide solution having a percentage causticity below 85% and to produce a finely divided slow settling calcium carbonate suitable in its state of precipitated division to act as a superior filler material for paper, and finally separating the resultant precipitated filler material from such liquor and washing such separated material to produce a filler material suitable for use as a filler for book paper and the like, said calcium carbonate as thus precipitated having a slow settling rate not to exceed 350 cc. in five minutes as described.

3. In the recovery of soda from spent digestion liquor of the paper pulp industry, the method of securing recovery of the soda as sodium hydroxide and of producing a fine grained calcium carbonate usable as a filler material for paper which comprises reducing the spent digestion liquor by incineration to sodium carbonate, lixiviating to provide a solution of such sodium carbonate free from objectionable carbon and the like impurities, slaking a high calcium lime in the presence of predetermined limited quantity of water substantialy free from sodium carbonate, maintaining the temperature during the slaking substantially below boiling while effecting thorough agitation whereby to secure quick and substantially complete slaking of the high calcium lime at such maintained below boiling temperature into a fine particle size calcium hydroxide, controlling the addition of the slaking water to give a suspension controlled as to dilution to substantially approximate a creamy consistency, admixing said sodium carbonate solution with said lime suspension with the sodium carbonate solution in an amount less than the equivalent chemical quantity of lime and insufficient to convert all the slaked lime to carbonate to provide a sodium hydroxide having a percentage causticity of above 85%, the above steps being conducted under such controlled proportioning as will give a ratio for reaction of approximately three and one-half parts of water to one part of reacting constituants, bringing the admixture to a boil with the formation of a calcium carbonate precipitate, separating the precipitate from the liquor, then adding a controlled limited but prepondering excess of soda ash solution to the separated precipitate to effect substantially complete conversion of the lime to carbonate and to provide a sodium hydroxide solution having a percentage causticity below 85%, whereby during each stage of controlled admixture to produce a finely divided slow settling calcium carbonate suitable in its state of precipitated division to act as a superior filler material for paper, and finally separating the resultant precipitated filler material from such liquor and washing such separated material to produce a filler material suitable for use as a filler for book paper and the like.

4. In the recovery of soda from spent digestion liquor of the paper pulp industry, the method of securing recovery of the soda as sodium hydroxide and of producing a calcium carbonate sufficiently fine grained as described to be usable as a filler material for paper which comprises selecting a high calcium lime selected as to its settling rate capacity as described, slaking such selected lime with a limited quantity of water substantially free from soda ash to produce a smooth slaked mixture of creamy consistency with the amount of slaking water in the proportion of the order of three and one-half parts of water to one of lime, adding soda ash solution to the slaked lime in an amount less than the equivalent chemical quantity and insufficient to convert all the slaked lime to carbonate, and to provide a solution having a percentage causticity of above 85%, and of the order of 90-93%, bringing the solution to a boil with the formation of a calcium carbonate precipitate, separating the precipitate from the liquor, then adding an excess of soda ash solution to the separated precipitate to complete the conversion of slaked lime to carbonate and to provide a solution having a percentage causticity of below 85% with the production of a finely divided slow settling high calcium lime filler material, and finally separating the resultant filler material from the liquor and washing, to produce a material suitable for use as a filler or pigment for paper.

5. In the recovery of soda from spent digestion liquor of the paper pulp industry, the method of securing recovery of the soda as sodium hydroxide and of producing a calcium carbonate sufficiently fine grained as described to be usable as a filler material for paper and in which the spent digestion liquor is reduced by incineration to sodium carbonate and lixiviated to provide a solution of sodium carbonate free from objectionable carbon and the like impurities which consists in carrying out the following steps with approximately the proportions of constituents as stated: slaking 3800 pounds of a high calcium lime in the presence of approximately 1600 gallons of water, maintaining the temperature during slaking substantially below boiling while effecting thorough agitation whereby to secure a slaked suspension of fine particle sized calcium hydroxide and admixing approximately 6500 pounds of sodium carbonate, as a solution containing approximately 15 pounds sodium carbonate per cubic foot, with said lime suspension, boiling the admixture to produce a liquor having a percentage causticity of above 85%, and of the order of 90–93%, and a calcium carbonate precipitate, thereafter removing the precipitate and adding 1000–1200 pounds of sodium carbonate in the form of additional sodium carbonate solution to said removed precipitate and boiling the mixture to produce a percentage causticity below 85% and thereafter separating the precipitate free from the reaction liquors and recovering the same as a fine, slow settling calcium carbonate of the character described and suitably fine as produced to be usable as a filler for book paper and the like.

6. In the recovery of soda from spent digestion liquor of the paper pulp industry, the method of securing recovery of the soda as sodium hydroxide and of producing a calcium carbonate sufficiently fine grained as described to be usable as a filler material for paper which comprises selecting a high calcium lime selected as to its settling rate capacity as described, slaking such selected lime with a limited quantity of water substantially free from soda ash to produce a smooth slaked mixture of creamy consistency with the amount of slaking water in the proportion of the order of three and one-half parts of water to one of lime, adding soda ash solution to the slaked lime in controlled limited amount substantially less than the equivalent chemical quantity and insufficient to convert all the slaked lime to carbonate and to provide a solution having a percentage causticity of above 85%, and of the order of 90–93%, with the formation of the calcium carbonate precipitate, separating the precipitate, then adding an excess of soda ash solution to the separated precipitate to convert the remaining unreacted slaked lime to calcium carbonate and to provide a solution having a percentage causticity of below 85%, with the production of a finely divided, slow settling high calcium lime filler material, and finally separating the resultant precipitated filler material from the liquor and washing, to produce a material suitable as such for use as a filler or pigment for paper.

7. The method as defined in claim 4 characterized in that the high calcium lime is selected according to the settling test as described to have a settling rate of less than 350 cc. in five minutes.

JAMES J. O'CONNOR.

CERTIFICATE OF CORRECTION.

Patent No. 2,211,908.  August 20, 1940.

JAMES J. O'CONNOR.

It is hereby certified that error appears in the printed specification of the above numbered patent requiring correction as follows: Page 5, second column, line 70, for "slacking a high calcium line" read --slaking a high calcium lime--; page 6, first column, line 62, claim 2, after "order" insert --of--; same page, second column, line 37, claim 3, for "constituants" read --constituents--; line 40-41, for "prepondering" read --preponderating--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.